April 6, 1965

B. E. ROBINSON 3,176,503

PRESSURE VESSEL LEAK TESTOR

Filed Dec. 19, 1962

INVENTOR.
BERNIE E. ROBINSON
BY
Pearce and Schaeper Klaus
Att'ys'

April 6, 1965     B. E. ROBINSON     3,176,503
PRESSURE VESSEL LEAK TESTOR
Filed Dec. 19, 1962     3 Sheets-Sheet 3

INVENTOR.
BERNIE E. ROBINSON
BY
Pearce and Schaeperklaus
Att'ys'

United States Patent Office 3,176,503
Patented Apr. 6, 1965

3,176,503
PRESSURE VESSEL LEAK TESTOR
Bernie E. Robinson, Green Township, Hamilton County, Ohio, assignor to Inteco Corporation, Green Township, Ohio, a corporation of Ohio
Filed Dec. 19, 1962, Ser. No. 245,726
6 Claims. (Cl. 73—40)

This invention relates to a testing apparatus, and in particular, to a device which determines fluid tightness in a pressure vessel, valve or receptacle.

A present method to determine the condition of the sealing features of a pressure vessel, e.g. globe, gate, and high pressure valves, is the water method in which the vessel is immersed in a body of water, a flow of air is fed therethrough, and the number of air bubbles rising to the water surface is counted. The number of bubbles trickling to the surface in a given amount of time determines whether or not adequate sealing features have been incorporated in the vessel's components, for the pressures under which the vessel is to be operated. This method is cumbersome, time consuming, and relatively expensive, particularly in relation to the labor required in testing the vessels.

An object of this invention, therefore, is to provide for an efficient, accurate and precise apparatus by which the fluid tightness of the sealing components of a pressure vessel may be readily tested to determine whether the vessel has been constructed satisfactorily or is defective.

Another object of this invention is to provide for a highly sensitive, efficient, and novel apparatus by which the rate of fluid loss from a pressure vessel, valve or receptacle may be determined and measured.

A further object of this invention is to provide for a simplified and relatively inexpensive operation by which fluid tightness of a pressure vessel may be ascertained in order that a determination of the acceptability of the vessel for the intended service pressures under which it is to operate may be made.

A further object of this invention is to provide for a sensitive testing apparatus having one or a multiple number of sensing or indicating means which will accurately and effectively determine the degree or degrees of fluid tightness of the vessel being tested.

Another object of this invention is to provide for a testing apparatus employing a balanced pneumatic system in which a volumetric loss is experienced in a portion thereof, and which loss is indicative of the state of fluid tightness of the vessel being tested.

Other objects and advantages will be apparent to those having ordinary skill in the art to which this invention pertains from the following description, the appended claims, and the accompanying drawings in which like reference characters indicate like parts in the specification, and in which:

Figure 1:
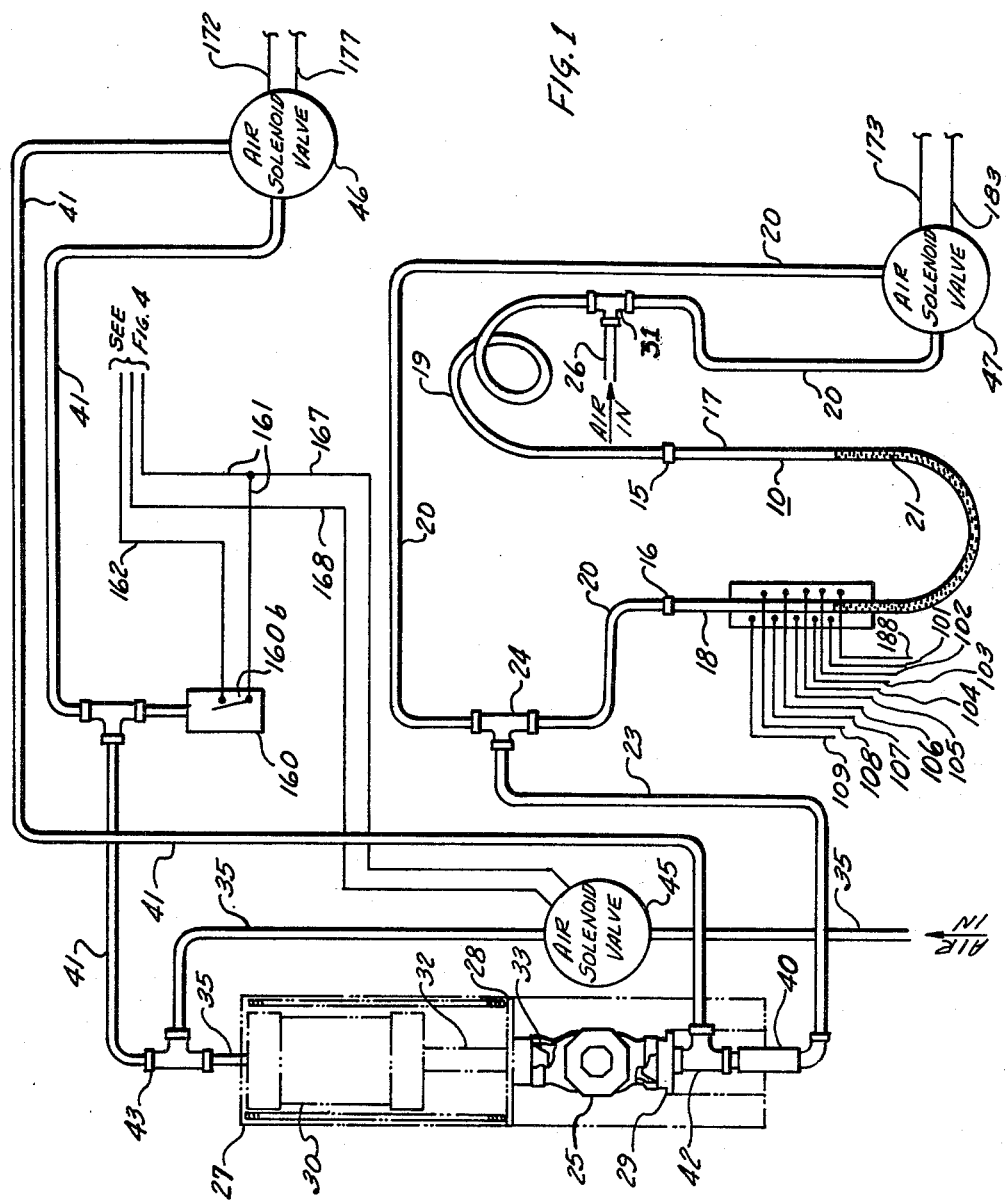
FIG. 1 is a view of what presently appears to be a preferred embodiment of the invention showing a U-tube and portions of the pneumatic circuit.
Figure 2:
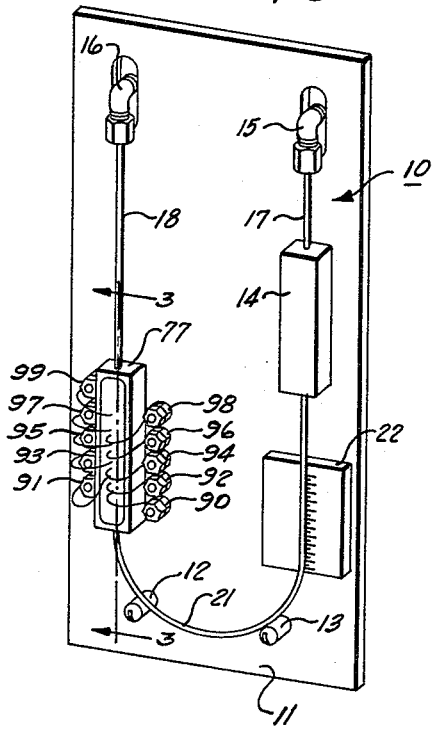
FIG. 2 is a view in perspective of a U-tube and some elements associated therewith.

Referring particularly to FIGS. 1 and 2, a hollow U-shaped glass tube 10 is spacedly mounted and supported from a vertical frame 11 adapted to be held in a stationary manner. U-tube 10 is mounted on or secured in relation to frame 11 by means of a pair of spaced rubber lugs 12 and 13 secured to frame 11 along the curved base of U-tube 10 and a supporting block 14 fixed to frame 11 and through which one leg of U-tube 10 extends. A pair of fittings 15, 16 are securely connected to the open ends of legs 17, 18, respectively, of U-tube 10 to provide for suitable attachment to conduits 19, 20 (FIG. 1), respectively. A free-floating column or piston of mercury 21 gravitationally rests in U-tube 10 when not subjected to developed pressures during the testing operation upon a pressure vessel, the level of the mercury in leg 17 always remaining above a common electrical terminal in the operation of a mechanical-electrical mode of operation of the device, as will be hereinafter evident. In operation of a mechanical mode of the apparatus, mercury 21 functions as a free moving piston whose displacement may be measured by comparison with a calibrated scale 22 (FIG. 2) secured to frame 11 adjacent U-tube 10 in a proximate and associated relationship to a leg along which its displacement may be measured. Such displacement corresponds to the volumetric loss sustained in an established balanced pneumatic system as a result of a leakage loss suffered through one or more of the various sealing components of a pressure vessel being tested. The fluid tightness of the vessel, i.e. the capacity of a vessel not to leak when subjected to fluid pressure therethrough, is of course directly correlated to the sealing features of the vessel. The volumetric displacement in U-tube 10, therefore, represents a loss of fluid from the vessel being tested, and measurement thereof indicates either that the vessel has been actually constructed to adequately seal under pressure conditions for which the receptacle has been designed, or is defective as a result of excessive leakage which would prevent the unit from being properly or successfully used under operating conditions as intended. Such excessive leakage in the pressure vessel adversely affects the balance of pressure in U-tube 10 and elsewhere in the pneumatic circuit during a testing cycle whereby mercury piston 21 is displaced in U-tube 10 to offset the loss of volume resulting from the leakage in the pressure vessel, as will be hereinafter evident.

The pneumatic system of this invention comprises U-tube 10, a pair of conduits 19, 20, each connected to its legs 17, 18, respectively, an air inlet line 26 connected to a suitable source of air such as an air compressor (not shown) and which is connected by means of a T-fitting 31 to conduits 19 and 20 leading to their respective legs of U-tube 10. A conduit 23 is connected to the left leg 18 of U-tube 10 by means of a T-fitting 24 in conduit 20 (or fitting 24 may be attached directly to fitting 16). Conduit 23 is attached to an inlet end of the body of a vessel or receptacle 25 (e.g., a globe or gate valve, for illustrative purposes) that is being tested for a leak or leaks.

In a simplified mechanical mode of operation, conduit 23 is directly attached by a suitable conventional fitting to the inlet end in the body of vessel 25, however, other connections are included in the preferred embodiment shown in FIG. 1 and described hereinafter.

Receptacle 25 is securely mounted in a fixture 27 during the testing cycle by means of a pair of spaced upright brackets 28, 29 in which vessel 25 rests. Behind bracket 28, an air cylinder 30 is rigidly mounted on fixture 27. Cylinder 30 includes a piston (not shown) and a piston shaft 32 attached thereto which are adapted to be actuated towards the other open end of the body of vessel 25 and to clamp the vessel in the fixture. An engageable rubber seal 33 on the end of shaft 32 is compressed or sealed against such other open end for the purpose of preventing air leakage therethrough during the testing period. Seal 33 is actuated by reciprocation of piston shaft 32 at the proper moment during testing, as will hereinafter appear.

The basic functioning of the simplified mechanical mode of operation of the invention is as follows:

Seal 33 is actuated by means of air pressure supplied to the head end of cylinder 30 by means of a conduit 35 that is connected to a suitable source of air such as an air compressor (not shown). Air pressure is then transmitted to above both legs 17, 18 of U-tube 10 by means of air inlet line 26, and conduits 19 and 20, respectively. Simultaneously, this same pressure is supplied to the inlet end of the body of vessel 25 by means of conduit 23. As soon as a balanced pneumatic circuit is established in all portions of the pneumatic system, air supply is cut off from leg 18 say, by means of a manual valve (not shown) located in conduit 20 next to T-element 31. However, main line 26 continues to feed air to leg 17 of U-tube 10 via conduit 19. A particular volume of air is trapped, therefore, in leg 18, conduit 23 and vessel 25. The volume loss suffered in the left leg 18 of U-tube 10 and conduit 23 as the result of leakage suffered by the vessel 25 being tested is compensated for or offset by line pressure moving piston mercury 21 around the loop or base of U-tube 10. The downward displacement of free-moving piston mercury 21 in leg 17 is measured by predetermined graduations calibrated onto scale 22. Thus, should displacement of mercury piston 21 exceed a predetermined distance measured on scale 22 during the period of compensation for the volumetric loss suffered in the pneumatic system, it would indicate that vessel 25 has sustained a severe enough leakage that it would be considered defective under normal operating conditions or for the purposes otherwise intended for the vessel.

It should be noted that throughout the entire testing period, the loss of a volume of air trapped in the pneumatic system is compensated for by the free mercury piston displacement in U-tube 10. The operation of the apparatus is not based directly on a pressure loss suffered by vessel 25, but rather upon a leakage of fluid volume suffered by the vessel.

In the preferred embodiment of the invention, modification is made in the assembly of the testing unit. Normally, the mercury column 21 is susceptible to a quick movement or eruption as pressure is applied and relieved in the system. To avert a sudden disturbance thereof by which the mercury could erupt from U-tube 10 into the various components of the system and thereby be lost for further use or thereby damage such components, a damper such as a regulator or metering valve 40 is interposed in conduit 23 adjacent the forward end of fixture 27, as seen in FIG. 1. Regulator 40 limits or reduces the flow of air into vessel 25, however it has no function in the actual testing of vessel 25. The insertion of a snubber such as 40, however, normally increases the time required to raise the pressure in vessel 25 to a testing pressure, hence an additional supply of air is fed to vessel 25 prior to a testing cycle through a conduit 41 attached to a T-fitting 42 interposed between the end of fixture 27 and metering valve 40. Conduit 41 returns to a primary source of air supply as at inlet line 35. A T-fitting 43 is included in conduit 41 adjacent cylinder 30 and is attached to conduit 35 whereby the same source of air provided for cylinder 30 is provided through T-fitting 42 to vessel 25. A manual valve (not shown) may be included in conduit 35 for the mechanical operation of the device described above.

Figure 4:
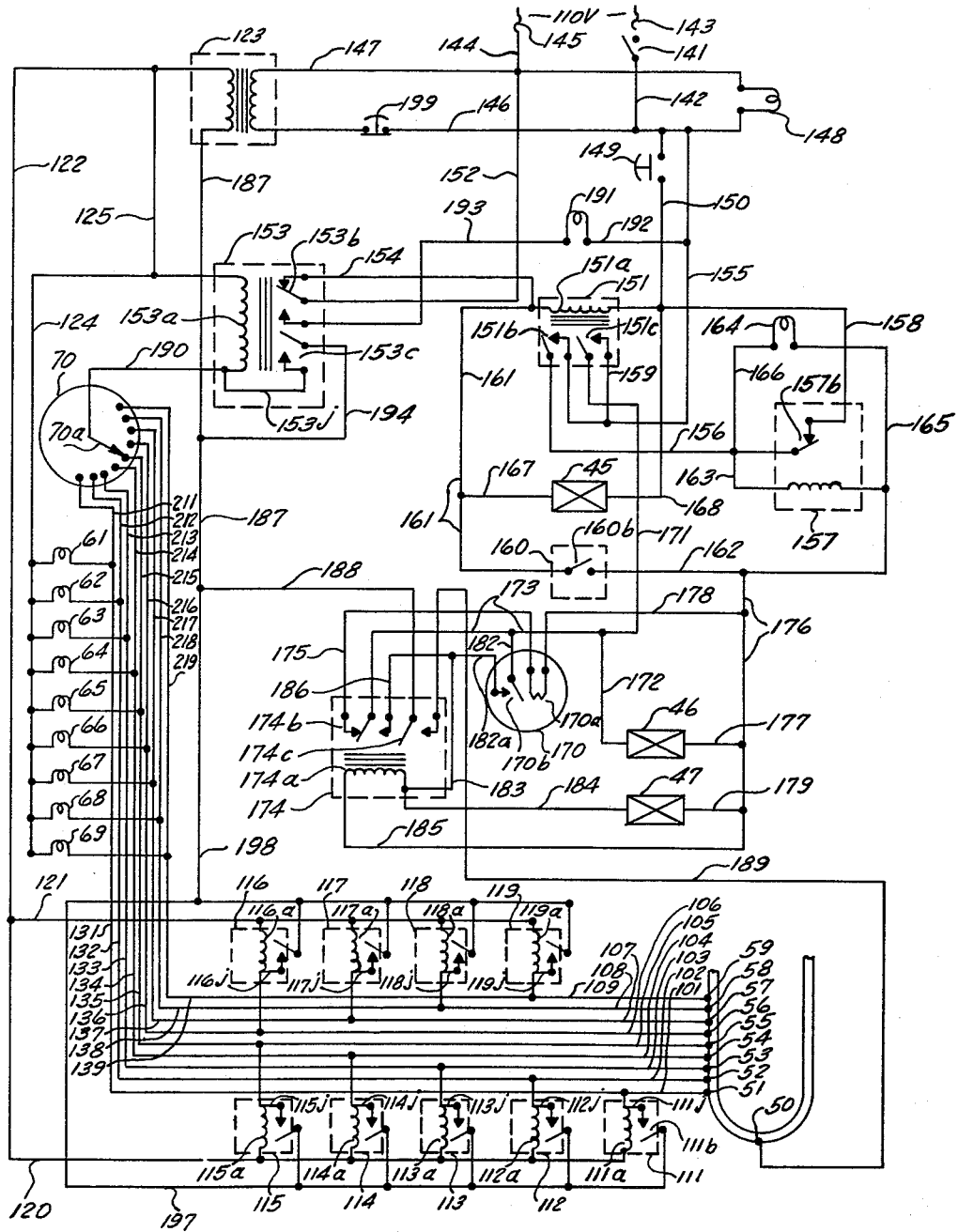
FIG. 4 is a schematic diagram of an electrical system employed in the illustrative embodiment of the invention.

An electrical complex is provided in place of scale 22, and is adapted to actuate air solenoid valves (i.e., solenoid-actuated air valves) in the pneumatic system, and to indicate by means of predetermined settings a volumetric loss experienced or developed in the testing system and by which a fluid leakage in a vessel being tested may be exactly determined and indicated. The sensing or indicator means therein indicate either a satisfactory pressure vessel, or indicate a rejection of such vessel when the apparatus determines it to be defective upon being subjected thereto. For purposes of this illustrative embodiment, a normally closed air solenoid valve 45 is interposed in conduit 35 as shown in FIGS. 1 and 4, a normally open air solenoid valve 46 is interposed in conduit 41, and a normally open air solenoid valve 47 is interposed in conduit 20, all of which are electrically actuated in proper sequence during the operation of this embodiment.

Such electrical complex (FIG. 4) includes the employment of a plurality of electrical circuits which are sequentially activated during a testing cycle on vessel 25, after which the acceptance of a good vessel or the rejection of a defective vessel is indicated, all of which is hereinafter more fully described.

Figure 3:
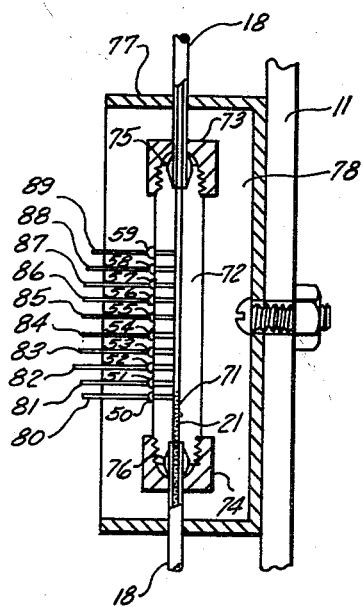
FIG. 3 is a sectional view taken along line 3—3 of FIG. 2, which passes through the center line of the vertical left leg of the U-tube.

As mercury piston 21 is displaced upwardly into leg 18 (FIG. 3), it functions as a contact in the electrical complex and will successively close a number of indicator circuits in the complex as it moves from gravitational rest immediately above a common terminal 50 mounted lowermost in leg 18 of U-tube 10, to contact each of a plurality of equally spaced terminals 51, 52, 53, 54, 55, 56, 57, 58, 59 mounted in leg 18 of U-tube 10. Each of these terminals with common terminal 50 constitutes, in effect, a switch, and as each such switch is closed by means of mercury 21, each of a plurality of indicator lights 61, 62, . . . 69, will correspondingly light, however, the position of a needle 70a of a selector switch 70 (FIG. 4) will determine the exact number of indicator lights that will be actuated or energized in any one given testing cycle before the testing operation is automatically terminated. A portion of leg 18 through which mercury 21 moves, is removed to provide for a construction of the series of terminals 50, 51 . . . 59, the extreme ends of which are set flush with a bore 71 of a tubing 72 in line with leg 18 through which the mercury 21 moves.

Plastic tubing 72 (FIG. 3), preferably nylon or vinyl, or other material which is impervious to mercury, is a non-conductor, and is machinable for the purpose of inserting such terminals therethrough. Tubing 72 is inserted between portions of and attached to leg 18 by means of a pair of compression fittings 73, 74 which accept the glass and are in the form of brass nuts with nylon ferrules 75, 76 to prevent splitting of the tube 72 about glass leg 18. The bore 71 of tubing 72 is of the same diameter as that of leg 18, and terminals 50, 51 . . . 59, comprising rhodium-plated brass screws, are inserted in and along tubing 72 at equal predetermined intervals or increments. Common terminal 50 is the lowermost positioned terminal in a housing 77 secured to frame 11. Wires or lines 80, 81 . . . 89, are securely attached to terminals 50, 51 . . . 59, respectively, after which an epoxy resin 78 encapsulates the contents of housing 77, tubing 72 and such terminals.

Each of lines 80, 81, . . . 89 are attached to a series of binding posts 90, 91, . . . 99, respectively, mounted on screws insulatedly attached to frame 11 adjacent their corresponding terminals. Each of a plurality of leads 101, 102, . . . 109 (FIGS. 2, 3, and 4) from each of the posts 91, 92, . . . 99, respectively, are connected to one side of each of a plurality of corresponding solenoid coils 111a, 112a, . . . 119a, respectively, in corresponding solenoid relay units 111, 112, . . . 119, respectively.

Each of a plurality of corresponding jumper wires 111j, 112j, . . . 119j in such units further connects each of such leads to the open side of corresponding relay switches in each of units 111, 112, . . . 119, respectively.

To the other side of each of the solenoid coils 111a, 112a, . . . 119a, power is supplied continuously from initial operation of the device. Such power is transmitted through lines 120 and 121 from a line 122 connected to one side of a 117 v.–12.6 v. stepdown transformer 123. It should be noted that until mercury 21 makes contact with a particular terminal 51, 52, . . . 59 in leg 18 of U-tube 10, A.C. current will not be supplied to the side of the coil adjacent the jumper wire in the unit which corresponds to the terminal 51, 52, . . . 59, respectively, nor will A.C. current be supplied to the right side of each of the indicator lights 61, 62 . . . 69 by means of conductors 131, 132, 133, 134, 135, 136, 137, 138, 139, each of which is connected to its corresponding indicator light and lead 101, 102, ... 109, as clearly shown in FIG. 4. Note, however, that power is being continuously supplied to the left side of lights 61, 62, ... 69, through a common line 124 which returns via a line 125 to line 122 and transformer 123.

When mercury 21 contacts a particular terminal in U-tube 10, both the corresponding indicator light will turn on and the solenoid coil in the corresponding relay unit will energize thereby closing the relay switch in such unit.

To ensure that a balanced pneumatic system is initially established for a particular vessel 25 being tested and after the device has been actuated, and before mercury 21 begins its displacement in U-tube 10, further electrical circuitry in the complex provides sufficient time to elapse in order to establish such a balance before the sequential contacts of mercury 21 and terminals 51, 52, ... 59, energize lights 61, 62, ... 69, respectively.

A toggle switch 141 is included in a line 142 connected to a 110 v. power supply (not shown) through a fuse 143, and with a line 144 from a second fuse 145 connected to such power supply, step-down transformer 123 is made operable by attaching such lines 142, 144 to lines 146, 147, respectively attached to the primary of such transformer. A system-on light 148 included in the primary circuit, will turn on when toggle switch 141 is closed. A start switch 149 is included in a line 150 leading from line 146 to one side of a holding coil 151a in a 110 v. solenoid relay unit 151. The momentary closing of spring-biased start switch 149 energizes solenoid coil 151a to close or set solenoid relay switches 151b and 151c, after which coil 151a remains energized, all through the following circuit: current is continually passing through a line 152 attached to line 147, through a normally closed double throw relay switch 153b of a 12 v. solenoid relay unit 153, through a line 154 to the left side of coil 151a; and with relay switch 151b closed by the momentary energization of unit 151, current from a line 155 passes through closed switch 151b, through a line 156, through a normally closed switch 157b of a timing device 157, and thence through a line 158 attached to the right side of coil 151a. Switch 151c is in parallel with switch 151b by means of a line 159 tapped off of line 155 and attached to switch 151c.

A 110 v. pressure switch unit 160 is included in the pneumatic and electrical circuits (FIGS. 1 and 4) whereby an electrical switch 160b therein is closed only when a predetermined air pressure exists in conduit 41, and which open switch will prevent or delay further actuation of other electrical circuits in the complex preparatory to the movement of mercury piston 21, until such pressure is reached and maintained, as will hereinafter appear. When such switch is closed in unit 160, current flows therethrough via the following circuits: a line 161 connects one side of the switch to line 154 at coil 151a, and a line 162 connects the other side of such switch to the right side of timing device 157.

When switch 160b closes, timer 157 is energized in view of the fact that A.C. current is carried to both sides of the timer at the instant. Power to the left side of the coil in timer 157 through line 156 and a line 163 has been maintained since the closing of relay switch 151b, and line 162 conveys current to the right side of the coil in timer 157. Test-on or timer light 164 will also turn on at this instant since it shunted across timer 157 by means of lines 165 and 166.

It may be noted here that air solenoid valve 45 is energized when start switch 149 is depressed and coil 151a is energized, in order to provide air to cylinder 30 so that vessel 25 is tightly clamped to fixture 27 through the entire testing period. Unless coil 151a is de-energized, valve 45 will not be, as shown in FIG. 4. A line 167 on the left side of valve 45 is tapped off line 161, and a line 168 on the right side of valve 45 returns to coil 151a.

With relay switch 151c set, power is supplied to the left side of open air solenoid valve 46 and to one side of a heating element 170a in a thermal time delay unit 170, by means of the following conductors: line 171 attached to closed relay switch 151c, line 172 to valve 46; from line 171 to a line 173 attached to a normally closed switch 174b in a solenoid relay unit 174, and thence through a line 175 to the one side of heater element 170a. When pressure switch 160b closes, normally open valve 46 and heating element 170a are made operable by the following respective circuits: current is carried from line 162 through a line 176 and a line 177 to the right side of valve 46 which is then so energized as to close off further air supply through conduit 41 to the inlet end of vessel 25; current is carried through line 176 to a line 178 attached to the other side of heater element 170a. It should also be noted that now power is carried to the right side of normally open air solenoid valve 47, by means of a line 179 connected between line 176 and the valve 47. When heater element 170a reaches its operating temperature, such condition will close a thermal switch 170b in unit 170 whereby air solenoid valve 47 is then energized to cut off air supply to the left leg 18 of U-tube 10, and at the same time to prepare the indicator lights 61, 62, ... 69 circuits for energization by mercury 21 rising in leg 18. With thermal switch 170b closed, current passes to valve 47 through a line 182 tapped off of line 173, switch 170b, lines 182a and 183 leading to the right side of the solenoid coil 174a in unit 174, and thence through a line 184 attached to valve 47. Coil 174a is simultaneously energized at this instance since power has been previously continuously carried to its left side by means of a line 185 attached to power line 176. With coil 174a energized, switch 174b and another switch 174c in unit 174 flip to different positions. Line 173 now engages a line 186 attached to line 183 and thereby continues to provide current to valve 47 and the right side of coil 174a, while line 175 attached to switch 174b no longer provides current to heater element 170a, as a result of which thermal delay unit 170 cools sufficiently in preparation for a subsequent testing cycle. The closing of switch 174c provides for the passage of current from the secondary of transformer 123 through lines 187, 188, switch 174c, and a line 189 to common terminal 50 in leg 18 of U-tube 10.

As noted before, power to the left side of indicator lights 61, 62, ... 69 is maintained by lines 125, and 124 off of the secondary of transformer 123. Corresponding lines 131, 132, ... 139 attached to the other side of lights 61, 62, ... 69, respectively, are connected each to corresponding jumper wires in their corresponding solenoid relay units 111, 112, ... 119, and also to corresponding leads 101, 102, ... 109, respectively. It is now apparent that the displacement of mercury 21 is the final action in the electrical circuitry before each of the indicator light circuits is activated. Thus, as a volumetric loss develops in vessel 25, mercury 21 ascends in leg 18 of tube 10, to close sequentially the corresponding circuits of the indicator lights.

A testing cycle is terminated in one of two ways: by operation of timing device 157 or by rejection of vessel 25 by the apparatus. In the former case, a predetermined unit of time is included in the functioning of timing device 157 after which switch 157b therein is actuated to open its circuit. Should mercury piston 21 which is displaced not make contact with the terminal in U-tube 10 that is directly correlated to the particular setting of the switch 70 and the indicator light corresponding to such terminal, timing device 157 is actuated after elapse of such predetermined unit of time. The termination of a cycle of testing by timer 157 therefore indicates that vessel 25 is constructed in a satisfactory manner, since the amount of volumetric loss sustained by vessel 25, if any, does not exceed the standard of maximum loss allowance for the particular vessel being tested. To impose a finer standard of maximum loss allowance upon vessel 25, selector switch 70 may be positioned at a lower numbered setting corresponding to a lower numbered indicator light.

When switch 157b is opened by means of operation of timer 157, coil 151a becomes de-energized, the result of which is to deny current to valve 45, to reduce the pressure in conduit 41 with consequent opening of pressure switch 160b, and to deny current to line 175 which takes same to valves 46, 47, and solenoid relay unit 174. Vessel 25 becomes unclamped in fixture 27, and air solenoid valves 45, 46, 47 return to their original state.

In the event that the displacement of mercury 21 carries to a terminal in U-tube 10 which is directly correlated or electrically connected to the particular setting of switch 70 and its corresponding indicator light, before the predetermined unit of time set into timer 157 elapses, the standard of maximum volumetric loss allowance is exceeded, the testing cycle is terminated, and the apparatus has rejected a defective vessel. In this case, coil 151a is de-energized by the opening of switch 153b in unit 153 between line 152 and line 154 leading to the left side of such coil. Switch 153b will flip to a second position when solenoid coil 153a is energized, thereby breaking the completed circuit to holding coil 151a. Power has been continuously supplied to the upper side of coil 153a through lines 125 and 124 from the secondary of transformer 123. However, until current passes to the lower side of coil 153a, it will not be energized. The passing of such current depends on which position selector switch needle 70a is set. The position of selector switch 70 determines the setting of a particular sensing means which will, when actuated, terminate the testing cycle. As shown in FIG. 4, for illustrative purposes, switch needle 70a is set in position #5 which corresponds to indicator light 65, and is connected thereto by means of a line 215. Thus, as it will be in the case also with lights 61, 62, 63, 64, 66, 67, 68, 69 and lines 211, 212, 213, 214, 216, 217, 218, 219, respectively, coil 153a will not energize until current passes through line 215, needle 70a and a line 190 connecting needle 70a to the lower side of coil 153a. The reason for this is as follows: It has been noted that power is supplied continuously to the upper side of coil 153a through lines 125 and 124. For current to pass to the lower side of coil 153a, it must be conducted through line 187 attached to the other side of the secondary of transformer 123, line 188, closed switch 174c, line 189, mercury 21, terminal 55, lines 105, 135, 215, selector switch needle 70a and line 190. Although the preceding coils 111a, 112a, 113a, 114a, are energized as the result of mercury piston 21 contacting corresponding terminals 51, 52, 53, 54, respectively, in U-tube 10, coil 153a will not be energized since none of lines 211, 212, 213, 214 are connected to switch 70.

Thus, with the flip of switch 153b, the pneumatic circuit is opened and the electrical complex is partially de-energized, and is so indicated by a reject light 191 which is shunted across the primary lines 146 and 147 by the following means: line 192 is connected to line 155 connected to line 146; switch 153b flips to connect line 152 attached to line 147, with line 193. Coil 153a remains energized as the result of relay switch 153c closing, thereby continuing current to the lower side of coil 153a via line 187, a line 194 to closed switch 153c, and a jumper wire 153j to coil 153a.

The five indicator lights remain on as the result of their corresponding relays in units 111, 112, 113, 114, and 115 continuing to be energized, although mercury 21 has returned to gravitational rest. Such energization for such lights and units may be illustrated by the circuit for light 61, and will suffice for an explanation of the remaining indicator lights and their corresponding solenoid relay unit circuits. Such circuit may be traced in the following manner: A.C. current passes through lines 125, 124, to the left side of light 61; current passes through lines 187, 198, 197, through closed relay switch 111b, jumper wire 111j and line 131 to the right side of light 61. Coil 111a remains energized in the following manner, to keep relay switch 111b closed: power is initially supplied to the lower side of coil 111a through lines 122 and 120. Coil 111a is first energized when mercury 21 contacts terminal 51 thereby carrying A.C. current to the upper side of coil 111a. Relay switch 111b then closes. Thereafter, and after termination of the testing cycle, current continues to flow to the upper side of coil 111a from the other side of the secondary of transformer 123 through lines 187, 198, 197, and closed relay switch 111b. All circuits except that for SYSTEM ON light 148 are released by means of a normally closed reset switch 199 provided in primary line 146, which when depressed, removes main power to transformer 123. Another cycle of testing may then be initiated by closing start switch 149.

In an actual operation of determining the condition of a gate valve designed for a 150 lb. per square inch capacity, the various elements in the apparatus included the following characteristics—

Step-down transformer 125: 117 v.–12.6 v. 50–60 cycle.
Timer 157: 600 v. max. A.C., 110–115 v., 60 cycle, with relay.
Air solenoid valves 45, 46, and 47: 115 v., 10 watts, 60 cycle, withstanding 150 lbs. per square inch.

These valves are arbitrary, depending on the size of vessel 25 being tested.

Pressure switch unit 160: Adjustable range is 5 to 150 pounds per square inch.
Solenoid relay units 151, 174: 117 v.
Solenoid relay unit 153: 12 v.
The bank of relay units 111, 112, . . . 119: 12 v. coil, A.C., 10 amps.
Thermal time delay unit 170: 110 v., 10 amps.

It should now be apparent that application of the invention may be applied to any pressure medium in which fluids, steam, and gases are utilized, and in which elements in the medium are adapted to withstand fluid leakages. It should also be apparent to those ordinarily skilled in the art to which this invention pertains, that one relay and indicator light or as many banks of relays and indicator lights may be introduced into the system as desired, depending upon the size of and the number of increments desired between the terminals in U-tube 10.

While the invention has been described and illustrated by the embodiments shown, it is not intended to be strictly limited thereto, and it is to be understood that the present disclosure has been made only by way of example, and that various changes and modifications may be employed therein without departing from the spirit and the scope of the invention as hereinafter claimed.

What is claimed, therefore, is:

1. An apparatus adapted to measure fluid tightness of a pressure vessel whereby said apparatus rejects a defective vessel or accepts same in a satisfactory condition, comprising, in combination, (1) a U-tube adapted to contain a freely movable mercury piston in its legs the displacement thereof along such legs reflecting fluid leakage loss sustained by the vessel, (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, and an additional conduit for supplying at line pressure air directly to the vessel not through said regulating means, thereby not increasing the time required for obtaining testing pressure in the vessel, (3) means provided for said pneumatic circuit system to cut off the supply of air to both legs of said U-tube and to said additional conduit supplying air to the vessel during the testing cycle thereon, and (4) means to indicate a volume loss of air sustained in said one of the legs of said U-tube and connecting conduit as a result of leakage loss sustained in such vessel.

2. An apparatus adapted to measure fluid tightness of a pressure vessel whereby said apparatus rejects a defective vessel or accepts same in a satisfactory condition, comprising, in combination,
   (1) a U-tube adapted to contain a freely movable mercury piston in its legs the displacement thereof along such legs reflecting fluid leakage loss sustained by the vessel,
   (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, an additional conduit for supplying at line pressure air directly to the vessel not through said regulating means, thereby not increasing the time required for obtaining testing pressure in the vessel, and a pressure switch unit in said additional conduit actuable at a predetermined pressure at which the vessel is to be tested,
   (3) means provided for said pneumatic circuit system to cut off the supply of air to both legs of said U-tube and to said additional conduit supplying air to the vessel during the testing cycle thereon, and
   (4) means to indicate a volume loss of air sustained in said one of the legs of said U-tube and connecting conduit as a result of leakage loss sustained in such vessel, said last mentioned means made operational by the closing of the switch in said pressure switch unit.

3. An apparatus adapted to measure fluid tightness of a pressure vessel whereby said apparatus rejects a defective vessel or accepts same in a satisfactory condition, comprising, in combination,
   (1) a U-tube adapted to contain a freely movable mercury piston in its legs the displacement thereof along such legs reflecting fluid leakage loss sustained by the vessel,
   (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, and an additional conduit for supplying at line pressure air directly to the vessel not through said regulating means, thereby not increasing the time required for obtaining testing pressure in the vessel,
   (3) means provided for said pneumatic circuit system to cut off the supply of air to both legs of said U-tube and to said additional conduit supplying air to the vessel during the testing cycle thereon, and
   (4) electrical indicating means associated with said U-tube for measuring the displacement of the pressure-subjected fluid in said U-tube resulting from a fluid leakage loss sustained in the vessel.

4. An apparatus adapted to measure fluid tightness of a pressure vessel whereby said apparatus rejects a defective vessel or accepts same in a satisfactory condition, comprising, in combination,
   (1) a U-tube adapted to contain a freely movable mercury piston in its legs the displacement thereof along such legs reflecting fluid leakage loss sustained by the vessel,
   (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, an additional conduit for supplying at line pressure air directly to the vessel not through said regulating means, thereby not increasing the time required for obtaining testing pressure in the vessel, and a pressure switch unit in said additional conduit actuable at a predetermined pressure at which the pressure vessel is to be tested,
   (3) means provided for said pneumatic circuit system to cut off the supply of air to both legs of said U-tube and to said additional conduit supplying air to the vessel during the testing cycle thereon, and
   (4) electrical indicating means associated with said U-tube for measuring the displacement of the pressure-subjected fluid in said U-tube resulting from a fluid leakage loss sustained in the vessel, said electrical indicating means energized and made operational by the displacement of and contact with the fluid in the U-tube after the switch in said pressure switch unit closes at the predetermined pressure.

5. An apparatus adapted to measure fluid tightness of a pressure vessel whereby said apparatus will reject a defective vessel or accept same in a satisfactory condition, comprising, in combination,
   (1) a U-tube adapted to contain a freely movable mercury piston in its legs the displacement thereof along such legs reflecting fluid leakage loss suffered by the vessel,
   (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, and an additional conduit in said system for supplying air directly to the vessel not through said regulating means, thereby not increasing the time required for obtaining testing pressure in the vessel,
   (3) a pressure switch unit in said additional circuit,
   (4) means in said pneumatic circuit system for cutting off line pressure to said one of the legs of said U-tube and connecting conduit thereby trapping air therein and in the to be tested vessel, and
   (5) electrical circuit means by which the displacement of the mercury piston in said U-tube is capable of being exactly measured, including
      (a) a plurality of terminals segmentally-positioned in said one of said legs,
      (b) a terminal in said U-tube common to each of said plurality of terminals,
      (c) a plurality of indicator means corresponding to said plurality of terminals, the displacement of the mercury piston in said U-tube completing a circuit between each terminal and its corresponding indicator means,
      (d) a timing device made operable upon closing of the switch in said pressure switch unit whereby the testing cycle is terminated after a predetermined elapse of time during which the vessel would be rejected had it been rejected by said apparatus,
      (e) a thermal time delay unit including a heater element and an open switch therein closing upon said heating element attaining its operating temperature, said thermal unit being made operative upon energization of said timer, said thermal unit delaying the starting of the testing cycle sufficiently long to provide for the establishment of a balanced uniform pressure in said pneumatic circuit system, said means in said pneumatic circuit energizing upon said open switch closing thereby cutting off air to said one of said legs and to the inlet end of the vessel,
      (f) means to remove said thermal delay unit from operation in order to cool such unit for a subsequent testing cycle, (g) selector means capable of being set in a position includable in a circuit for any one particular indicator means, the limit of the number of said indicator means energized being dependent upon the position taken by said selector means, after energization of which number the testing cycle is terminated, said timing device being actuated to terminate the testing cycle should the number of said indicator means capable of being energized does not energize as the result of the failure of the mercury piston to contact the terminal in said U-tube corresponding to the indicator means to which said selector means is set.

6. An apparatus capable of measuring the fluid tightness of a pressure vessel whereby said apparatus rejects such vessel as being defective or accepts same to be in satisfactory condition by not sustaining too great of a predetermined fluid leakage loss, comprising, in combination, (1) a U-tube adapted to contain a freely movable electrically-conducting fluid piston therein the displacement thereof in said U-tube indicative of a leakage loss sustained by the vessel, (2) a pneumatic circuit system maintained by a line pressure conduit and comprising conduits for supplying air individually to each leg of said U-tube, a connecting conduit between one of the legs of said U-tube and the inlet end of the vessel being tested, means to regulate flow of air to the vessel mounted in said connecting conduit, and an additional conduit in said system for supplying air directly to the vessel not through said regulating means, thereby not increasing the time required for obtaining testing pressure in the vessel, and a pressure-switch unit having an electrical switch therein mounted in said additional circuit, said switch closing upon a predetermined amount of pressure being introduced into said additional circuit, and (3) electrical means by which the displacement of the conductor-piston is capable of being measured comprising (a) a plurality of indicator or sensing means each indicating an increment of such displacement, (b) a number of terminals corresponding to said plurality of indicator means and mounted at segmental positions in said one of said legs, (c) a common terminal mounted lowermost in said U-tube, (d) a timing device made operable upon closing of said electrical switch whereby a testing cycle on the vessel is terminated after a predetermined elapse of time during which the vessel would be rejected had it been rejected by said apparatus, (e) a thermal time delay unit including a heater element and an open thermal switch therein closing upon said heating element attaining its operating temperature, said thermal unit being made operative upon energization of said timer, said thermal unit delaying the starting of the testing cycle sufficiently long to provide for establishment of a balanced uniform pressure across the legs of said U-tube and conduit attached to the inlet end of the vessel, (f) means energized by the closing of said thermal switch whereby current passes to said common terminal, such means capable of removing said thermal delay unit from operation during the testing cycle in order to cool such unit for a subsequent testing cycle, (g) an air solenoid valve means in the conduit to said one of the legs and vessel of said conduits for supplying air individually to each leg of said U-tube, said valve means energizing upon energization of said energized means thereby cutting off air supply to said one of said legs and to the vessel, the conductor-piston functioning as a contact that closes before energization of each of said indicator means, (h) selector means capable of being set in a position includable in a circuit for any one particular indicator means, the limit of the number of indicator means energized being dependent upon the position of said selector means, said timer being actuated to terminate the testing cycle when the number of indicator means capable of being energized is not energized.

References Cited by the Examiner

UNITED STATES PATENTS

| | | | |
|---|---|---|---|
| 1,097,348 | 5/14 | Murray | 340—227 |
| 2,853,874 | 9/58 | Mennesson | 73—40 |
| 2,872,806 | 2/59 | Mamzic. | |

ISAAC LISANN, *Primary Examiner.*